(12) United States Patent
Rilat et al.

(10) Patent No.: US 11,046,278 B2
(45) Date of Patent: Jun. 29, 2021

(54) COVER ASSEMBLY FOR AN AIRBAG MODULE

(71) Applicant: Key Safety Systems, Inc., Sterling Heights, MI (US)

(72) Inventors: Nicolas Rilat, Le Chesnay (FR); Alexandru Ciocan, Brad (RO); Marius-Ioan Bogdanesc, Geoagiu-Bai (RO)

(73) Assignee: Key Safety Systems, Inc., Sterling Heights, MI (US)

( * ) Notice: Subject to any disclaimer, the term of this patent is extended or adjusted under 35 U.S.C. 154(b) by 94 days.

(21) Appl. No.: 16/150,850

(22) Filed: Oct. 3, 2018

(65) Prior Publication Data
US 2019/0126881 A1      May 2, 2019

Related U.S. Application Data

(60) Provisional application No. 62/579,313, filed on Oct. 31, 2017.

(51) Int. Cl.
*B60R 21/2165*      (2011.01)
*B60R 21/203*       (2006.01)
(Continued)

(52) U.S. Cl.
CPC ...... *B60R 21/21656* (2013.01); *B60R 21/203* (2013.01); *B60R 21/2165* (2013.01);
(Continued)

(58) Field of Classification Search
CPC .............. B60R 21/203; B60R 21/2035; B60R 21/2165; B60R 21/21656; B60R 21/21658
See application file for complete search history.

(56) References Cited

U.S. PATENT DOCUMENTS

| 5,082,310 A | * | 1/1992 | Bauer | B26D 3/085 |
| | | | | 280/728.3 |
| 5,498,026 A | * | 3/1996 | Eckhout | B60N 2/58 |
| | | | | 280/728.3 |

(Continued)

FOREIGN PATENT DOCUMENTS

| CN | 106346872 | 1/2017 |
| DE | 19944371 | 3/2001 |

(Continued)

OTHER PUBLICATIONS

Machine translation of JP2010158915A (Year: 2020).*

*Primary Examiner* — Barry Gooden, Jr.
(74) *Attorney, Agent, or Firm* — Meunier Carlin & Curfman LLC

(57) ABSTRACT

An airbag cover assembly of an airbag module has a molded housing cover and a thin leather or imitation outer cover. The molded housing cover is configured for attachment to the airbag module. The housing cover has an outer surface and an inner surface. The inner surface has a plurality of tear seams arranged to break along a predetermined path. The thin leather or imitation leather outer cover is glued or otherwise affixed directly onto the outer surface of the housing cover. The leather or imitation leather outer cover has a generally uniform thickness devoid of tear seams. The thin leather or imitation outer cover has a thickness of less than 1.0 mm, preferably 0.6 mm. The outer cover is constructed from three separate pieces stitched together with threads longitudinally along a curved arc.

10 Claims, 10 Drawing Sheets

(51) Int. Cl.
  *B60R 21/215* (2011.01)
  *B32B 7/12* (2006.01)
  *B32B 9/02* (2006.01)

(52) U.S. Cl.
  CPC ............... *B32B 7/12* (2013.01); *B32B 9/025* (2013.01); *B32B 2605/003* (2013.01); *B60R 2021/21543* (2013.01)

(56) References Cited

U.S. PATENT DOCUMENTS

| | | | | |
|---|---|---|---|---|
| 5,501,485 | A * | 3/1996 | Eckhout | B60N 2/58 280/728.3 |
| 5,590,902 | A * | 1/1997 | Eckhout | B60N 2/58 200/61.54 |
| 5,957,483 | A * | 9/1999 | Miltenberger | B60R 21/2165 280/728.3 |
| 6,443,484 | B2 * | 9/2002 | Anglsperger | B60R 21/216 280/728.3 |
| 6,495,799 | B1 * | 12/2002 | Pillsbury, IV | B60R 21/21656 219/204 |
| 6,994,372 | B2 * | 2/2006 | Ford | B60R 21/2035 280/728.2 |
| 7,004,497 | B2 | 2/2006 | Thomas et al. | |
| 7,625,004 | B2 | 12/2009 | Geltinger et al. | |
| 7,766,381 | B2 | 8/2010 | Takeshi et al. | |
| 7,938,437 | B2 | 5/2011 | Lippert et al. | |
| 8,132,307 | B2 | 3/2012 | Aichner et al. | |
| 8,496,264 | B2 | 7/2013 | Rolf et al. | |
| 8,678,458 | B2 | 3/2014 | Filipp | |
| 9,061,649 | B2 | 6/2015 | Thielhorn | |
| 9,073,508 | B1 * | 7/2015 | Chascsa, II | B60R 21/21658 |
| 9,260,074 | B2 | 2/2016 | Fujita et al. | |
| 9,296,354 | B1 | 3/2016 | Preisler et al. | |
| 9,580,037 | B2 | 2/2017 | Tomai | |
| 10,144,384 | B2 * | 12/2018 | Ooka | B60R 21/203 |
| 2001/0019200 | A1 * | 9/2001 | Hehl | B60R 13/02 280/728.1 |
| 2002/0014764 | A1 * | 2/2002 | Anglsperger | B60R 21/216 280/743.1 |
| 2002/0060446 | A1 * | 5/2002 | Kassman | B60R 21/2155 280/728.3 |
| 2003/0228456 | A1 * | 12/2003 | Hehl | B60R 13/02 428/304.4 |
| 2004/0021303 | A1 * | 2/2004 | Ford | B60R 21/2035 280/728.3 |
| 2004/0130131 | A1 * | 7/2004 | Thomas | B60R 21/21656 280/731 |
| 2014/0333052 | A1 | 11/2014 | Junichi et al. | |
| 2014/0375031 | A1 * | 12/2014 | Bichler | B60R 21/21656 280/728.3 |
| 2016/0137154 | A1 | 5/2016 | Sasu et al. | |
| 2017/0282837 | A1 * | 10/2017 | Ooka | B60R 21/203 |
| 2017/0305379 | A1 * | 10/2017 | Shick | B60R 21/205 |

FOREIGN PATENT DOCUMENTS

| | | |
|---|---|---|
| JP | 11170951 | 6/1999 |
| JP | 2009120038 A * | 6/2009 |
| JP | 2010158913 A * | 7/2010 |
| JP | 2010158915 A * | 7/2010 |

* cited by examiner

COVER ASSEMBLY FOR AN AIRBAG MODULE

FIELD OF THE INVENTION

The present invention relates to frangible airbag covers for airbag module assemblies generally, more particularly to an assembly of a leather or synthetic outer cover affixed onto a frangible airbag housing cover.

BACKGROUND OF THE INVENTION

Driver side airbags and passenger side airbags are commonly provided as assemblies attached on the steering wheel or front dash of a vehicle. Side airbag modules are associated with vehicle seats. Other modules include modules associated with an A-pillar of the vehicle. Most airbag assemblies are designed with a housing cover that breaks along tear seams as the airbag deploys.

Great care is taken to make these housing covers break in a safe and controlled manner to insure occupant safety. The designs are configured to minimize fragments or other undesirable projections.

The designs are also made to be complementary to the interior cosmetic design. In some cases, the outer cover has the vehicle logo or emblem incorporated into the design. In all cases an objective is to make the appearance aesthetically pleasing.

In practice, not only the appearance or look, but also the feel and texture of the outer cover surface is important. Many designs have leather or simulated leather synthetic coverings often overlaying a spongy feeling intermediate layer of rubber or synthetic foam mounted over the frangible housing cover.

In almost all cases great care is taken to mask or conceal the underlying tear seams on the hard plastic housing cover. The housing cover is typically an injection molded plastic part with attachment features that snap into and lock the housing cover onto an airbag housing fixed to the steering wheel, seat, vehicle pillar or the dash. Once assembled, the inflatable airbag is hidden under the housing cover.

Many times, the depressions caused by the tear seams molded into the plastic housing cover are seen and visible to the occupant. Some designers find this desirable, but others prefer to conceal these features. The use of a cushioning intermediate layer can be helpful in this regard, but over time the outer cover leather layer can sag and exhibit wrinkles.

The present invention as described herein provides a unique assembly of a leather or simulated leather outer cover affixed to a housing cover without any discernable underlying tear seams.

SUMMARY OF THE INVENTION

An airbag cover assembly of an airbag module has a molded housing cover and a thin leather or imitation outer cover. The molded housing cover is configured for attachment to the airbag module. The housing cover has an outer surface and an inner surface. The inner surface has a plurality of tear seams arranged to break along a predetermined path. The thin leather or imitation leather outer cover is glued or otherwise affixed directly onto the outer surface of the housing cover. The leather or imitation leather outer cover has a generally uniform thickness devoid of tear seams. The thickness of the covering material can vary widely perhaps within a range of about 5 mm to 0.25 mm. In samples made, thickness was less than 1.0 mm to about 0.6 mm. In the illustrated embodiment the outer cover is constructed from three separate pieces stitched together with threads longitudinally along a curved arc, however other constructions are within the scope of the present invention. The pieces are a middle piece and two side pieces. The pieces form a dome shaped outer cover with a pair of threaded assembly seam lines.

The middle piece has an hourglass shape and the two side pieces are arc shaped. One side piece is on each side of the middle piece. The outer cover threaded assembly seam lines extend inwardly, and the housing cover has a pair of complementary grooves or slots to receive the threaded assembly seam lines allowing the thin leather or imitation leather outer cover to lie smoothly over the outer surface of the housing cover.

Each threaded assembly seam line has a pair of notches for visual location of the outer cover for positioning onto the housing cover on assembly. On each side piece each threaded assembly seam line is an outer thread forming a decorative or styling line.

The thin leather or imitation leather outer cover has no tear seam and the outer cover ruptures or tears randomly as the housing cover breaks along a predetermined path defined by the plurality of tear seams.

BRIEF DESCRIPTION OF THE DRAWINGS

The invention will be described by way of example and with reference to the accompanying drawings in which.

DETAILED DESCRIPTION OF THE INVENTION

Figure 1:
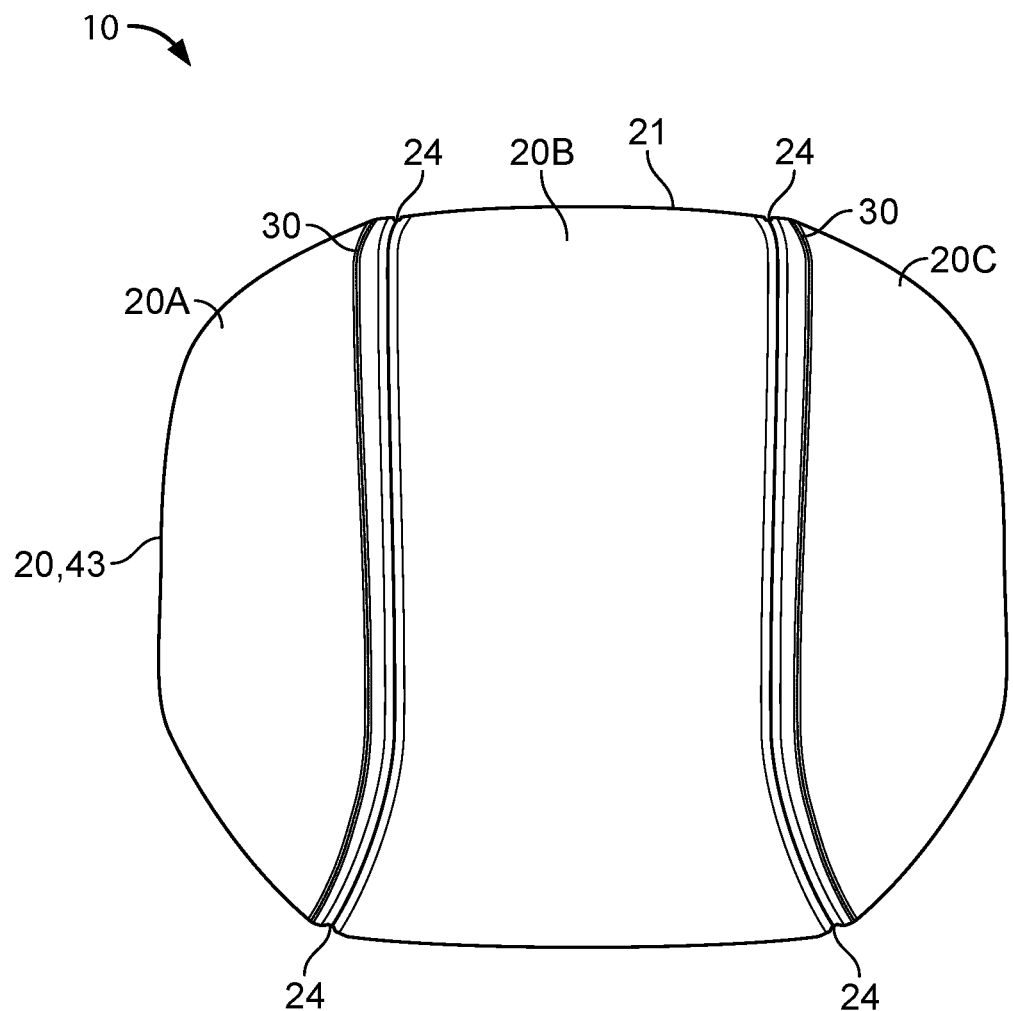
FIG. 1 is a top view of the thin leather or imitation leather outer cover made of three pieces sewn together and then assembled onto and affixed to a molded plastic housing cover.
Figure 1A:
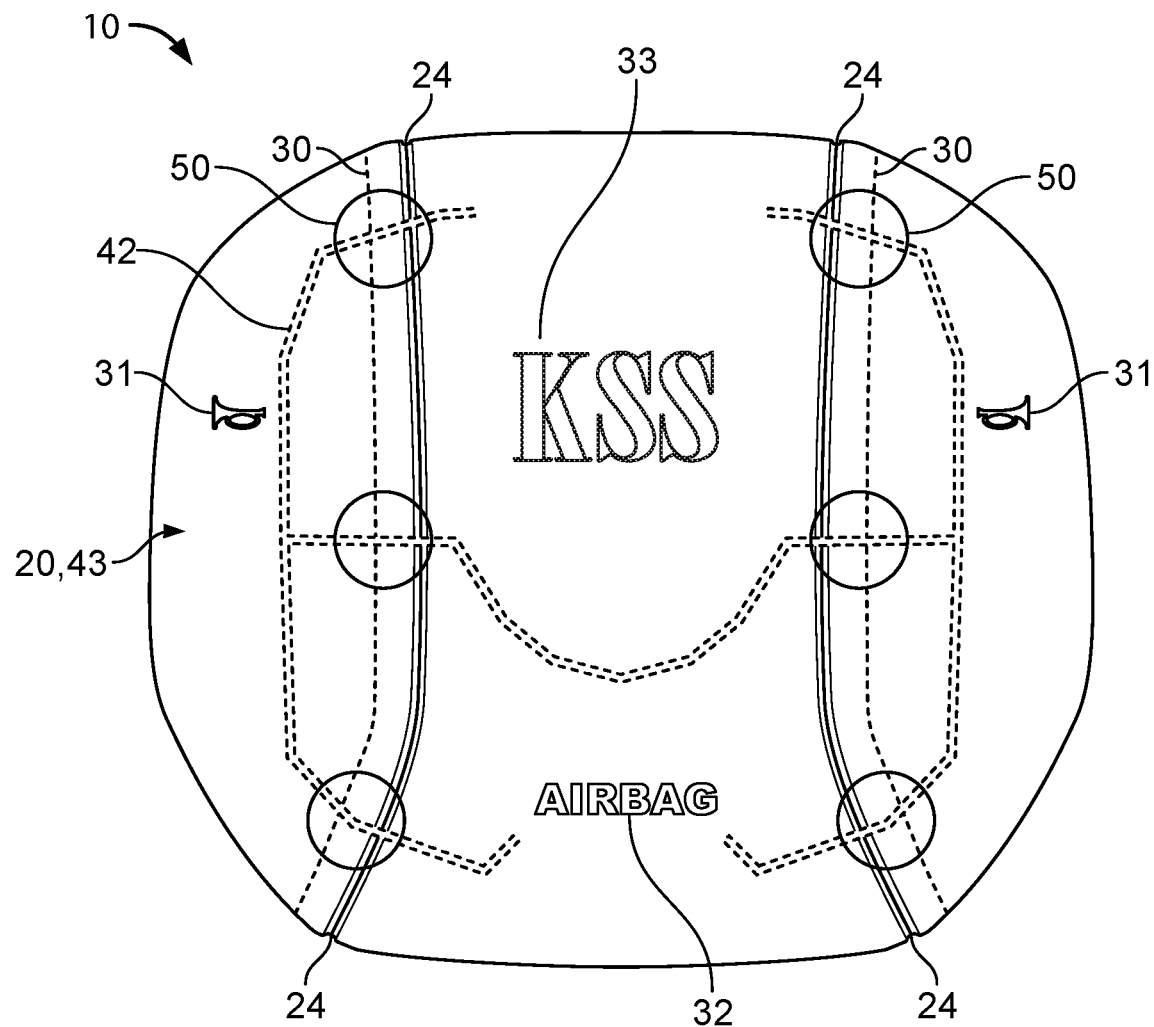
FIG. 1A is the same view taken from FIG. 1, but with bold lines showing the location of underlying tear seams for the housing cover and the threaded sewing line inward of a cosmetic styling thread line shown in bold dashed lines.

With reference to FIGS. 1 and 1A, an airbag assembly 10 is illustrated. The airbag assembly 10 has a molded housing cover 40 configured for attachment to an airbag module. This exemplary embodiment is configured to fit on a steering wheel module. The housing cover 40 has an outer surface 43 and an inner surface 41. The inner surface 41 has a plurality of tear seams 42 arranged to break along a predetermined path. The tear seams 42, as shown, have two opposing longitudinal extending depressions molded into the inner surface 41 of the housing cover 40 and, transverse and extending between the two longitudinal extending tear seams 42, is a tear seam 42 generally horizontal with a slight dip in the center of the airbag housing cover 40.

As shown, the airbag housing cover 40 is preferably made as an injection molded plastic part and these depressions forming the tear seams 42 provide a weakened area such that on airbag deployment the housing cover 40 will break along these lines creating a predetermined opening path from which the underlying airbag upon inflation will pass as the tear seams 42 break open.

As further shown in FIGS. 1 and 1A, a leather or imitation leather outer cover 20 is shown covering the outer surface 43 of the housing cover 40. This thin leather or imitation leather outer cover 20 is glued or otherwise affixed onto the outer surface 43 of the housing cover 40. The leather or imitation leather outer cover 20 has a generally uniform thickness devoid of any tear seams. As illustrated, the outer cover 20 has been formed from three pieces or strips of material, a middle piece 20B and two side pieces 20A, 20C. Each piece or strip of material has a thickness of 1.0 mm or less, preferably 0.6 mm thick.

The outer cover 20 is stitched together along assembly seam lines 24 shown on the left side 20A and right side 20C seamed to lateral edges of the middle piece 20B. Each side piece 20A, 20C is additionally stitched as shown with a decorative sewing line 30 along the exterior surface 21 of the outer cover 20. The exterior surface 21 is designed with the decorative sewing lines 30 fully visible on the exterior surface 21. On a lateral outboard side of each assembly seam 24 the decorative sewing line 30 is shown which creates a false impression of where the outer cover 20 is stitched together when, in fact, the outer cover 20 is sewn together at the assembly seam lines 24.

With reference to FIG. 1A, further shown as embossed depressions on the outer cover 20 are indicia in the form of a horn 31 on each side and the marking "AIRBAG" 32 on a lower middle portion, almost centered on the outer cover 20 is a stylized indicia of a logo or emblem 33 of the vehicle. Further shown in FIG. 1A, the underlying tear seams 42 of the housing cover 40 are shown in dark bold lines to let the reader visualize where the underlying housing cover 40 will break. Along the decorative sewing lines 30 are shown circles 50. These circles 50 which are diametrically shown on the top of the cover indicate locations where the tear seams 42 intersect with the assembly seam lines 24 and the decorative sewing lines 30 on the bottom surface of the cover which is shown in FIG. 2A. It is important to note that in this design the outer cover 20 is permanently affixed to the outer surface 43 of the housing cover 40 by gluing or otherwise affixing the outer cover 20 directly onto the outer surface 43.

There are no predetermined tear seams or intermediate component layers used in the present invention. The outer cover 20 has no predetermined break path, but in fact can break randomly as the underlying housing cover 40 tear seams 42 rupture. This is important because by providing no tear seams on the outer cover 20, there are no visible or discernable marks. In addition, by not having an intermediate layer and being directly affixed to the housing cover 40, the outer cover 20 will maintain a rigid leather feel that is devoid of stretch marks, dimples or depressions as can occur in airbag module assemblies when a spongy or soft intermediate layer is used between the outer cover 20 and the housing cover 40.

Figure 2:
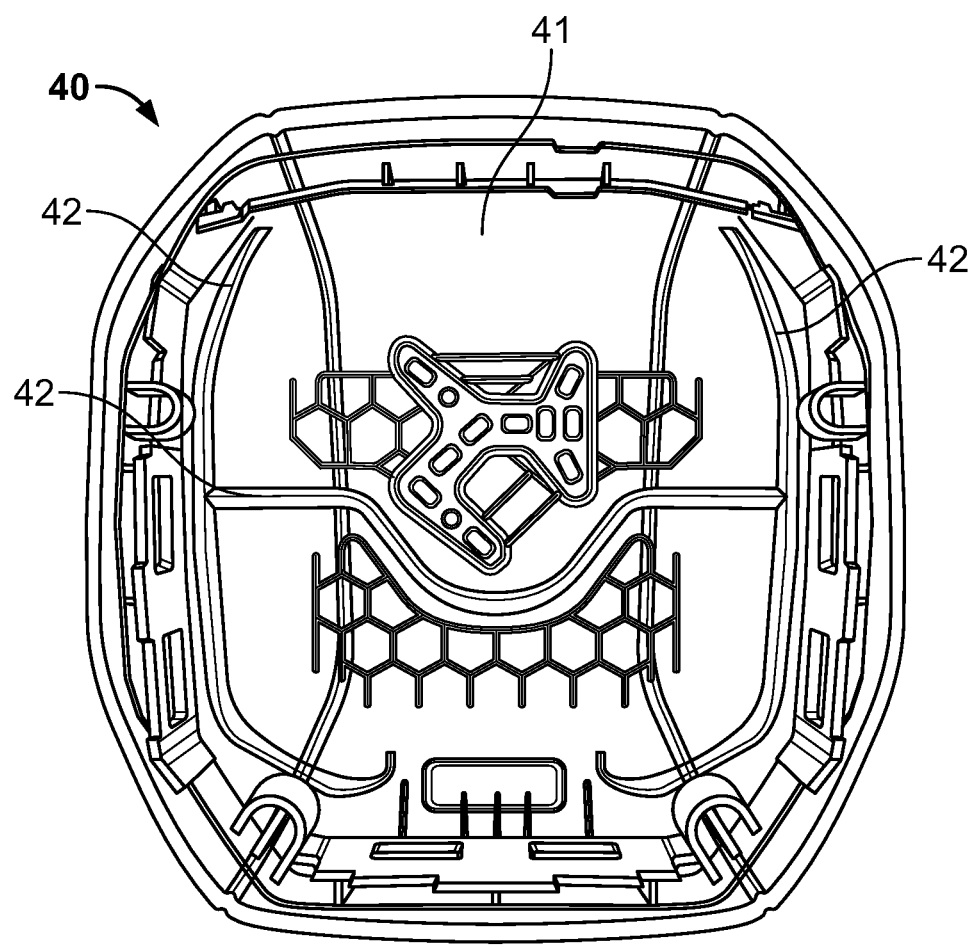
FIG. 2 is a bottom view of the inner surface of the housing cover of the present invention.
Figure 2A:
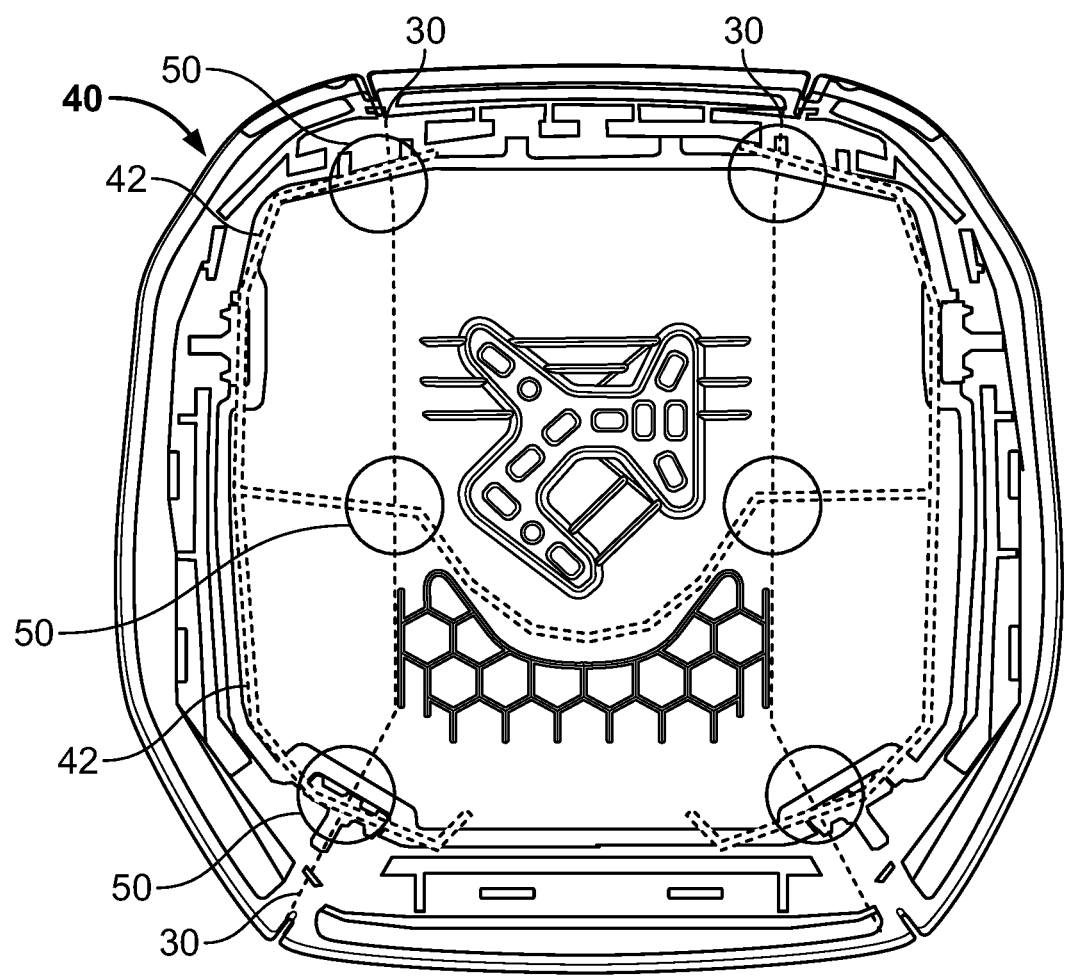
FIG. 2A is a bottom view of the housing cover emphasizes the locations of the tear seams and with the intersection of the tear seams of the housing cover and the thread seams of the leather or imitation leather outer cover shown inside circles. These tear seams are also shown in FIG. 2.
Figure 2B:
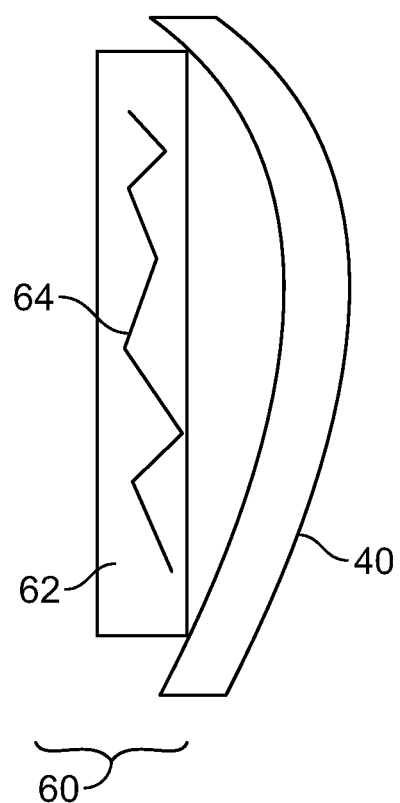
FIG. 2B illustrates a representative airbag module.

With reference to FIGS. 2 and 2A, the plastic housing cover 40 is better illustrated. Around the outer periphery are molded in structural attachments for shaping the assembly 10 onto an underlying module housing fixed to a steering wheel. The underside of the housing cover 40 creates a concavity along the interior surface 41 along with the tear seams 42 which are clearly visible. It is important to note that the tear seams 42 provide predetermined paths from which the housing cover 40 will break, however due to the thinness of the outer cover 20 the location of the first rupture or break of the outer cover 20 is not determinable and will break randomly based on the explosive force of the airbag as it is deploying. FIG. 2A again illustrates the inner sections of the tear seams 42 and the depressions of the assembly seam lines 24 and dashed lines showing the decorative sewing lines 30. FIG. 2B is representative of any airbag module 60 and includes a housing 62, airbag 64 and cover 40. This module 60 is representative of any decoratively covered module with leather or other material including a driver airbag module, passenger airbag module, knee airbag module, side airbag module, pillar mounted airbag module.

Figure 3:
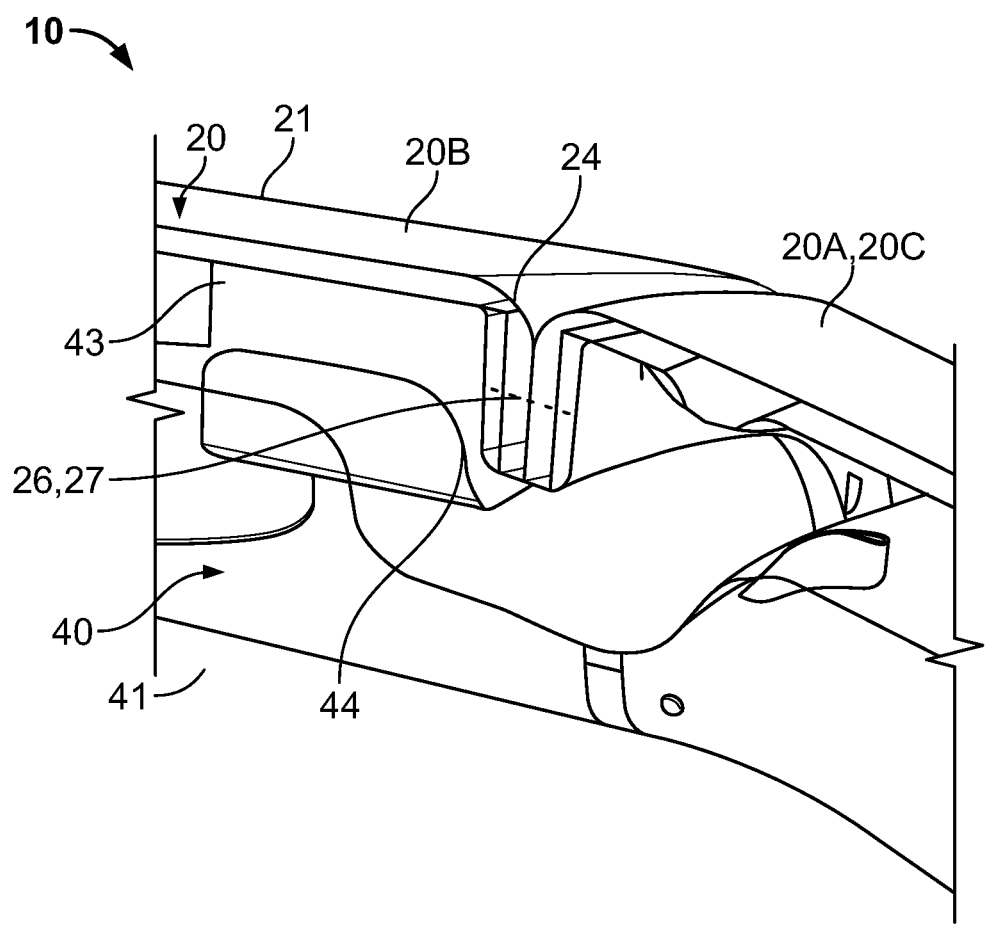
FIG. 3 is a partial cross-sectional view showing the stitched seam line in a groove on the outer surface of the housing cover.

With reference to FIG. 3, a partial cross section is shown where one side portion 20A or 20C and the middle portion 20B are shown joined together at the assembly seam line 24. In FIG. 3, the assembly seam line 24 is shown pushed into a groove or slotted depression on the housing cover 40. This depression or groove 44 accommodates both sides of the assembly seam line 24 and when the seam line 24 is stitched together using a pair of threads 26 and 27, the pair of threads 26, 27 are aligned, one entering from one side and the other from the opposite side. These threads 26, 27 create a secure joining of the seamed and stitched pieces 20A, 20B, 20C. These assembly seam lines 24 stitched as shown are then pushed into the groove 44 to allow the outer cover 20 to lie flush against the outer surface 43 of the housing cover 40.

Figure 4:
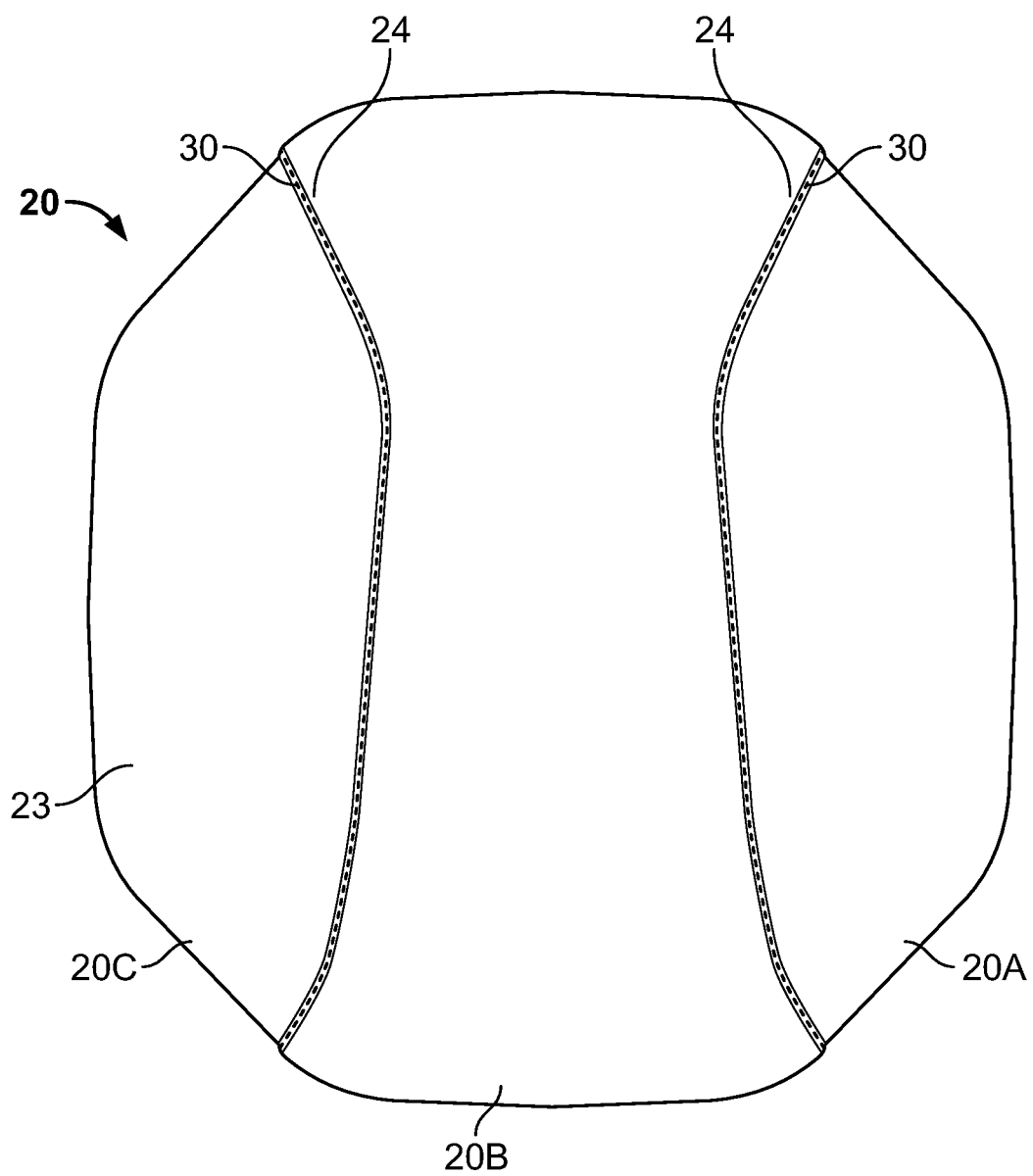
FIG. 4 is an inside or inner surface view of the leather or imitation leather outer cover shown as a three-piece assembly stitched together for forming a dome shaped outer cover.

FIG. 4 illustrates the inner surface 23 of the outer cover 20. As shown the decorative sewing lines 30 are illustrated as white threads and the assembly seam line 24 is shown inboard of the sewing lines 30 on each side of the outer cover 20.

Figure 5:
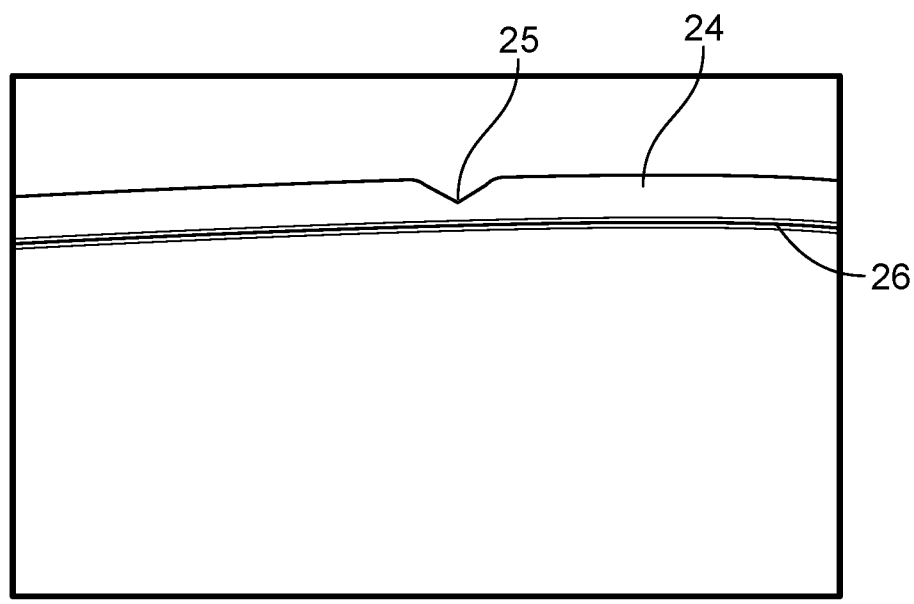
FIG. 5 shows a side view of the stitched seam with a position locator notch.

It is important to note, as shown in FIG. 5, that the assembly seam lines 24 have a plurality of locator notches 25. These notches 25 are provided in two or more locations on each seam line 24 spaced longitudinally in such a way that it allows the operator to align the outer cover 20 with the housing cover 40 on assembly. These notches 25 are visual indicators to provide a location so that the outer cover 20 when assembled and glued to the housing cover 40 will be properly positioned on corresponding projections in the slot or groove 44 on the housing cover 40 and properly aligned. These notches 25 weaken the seams locally by having a pre-cut on the leather seam 24 just outside the threads 26, 27 to allow an initiation of seam 24 tearing, but without defining a tear path.

Figure 6:
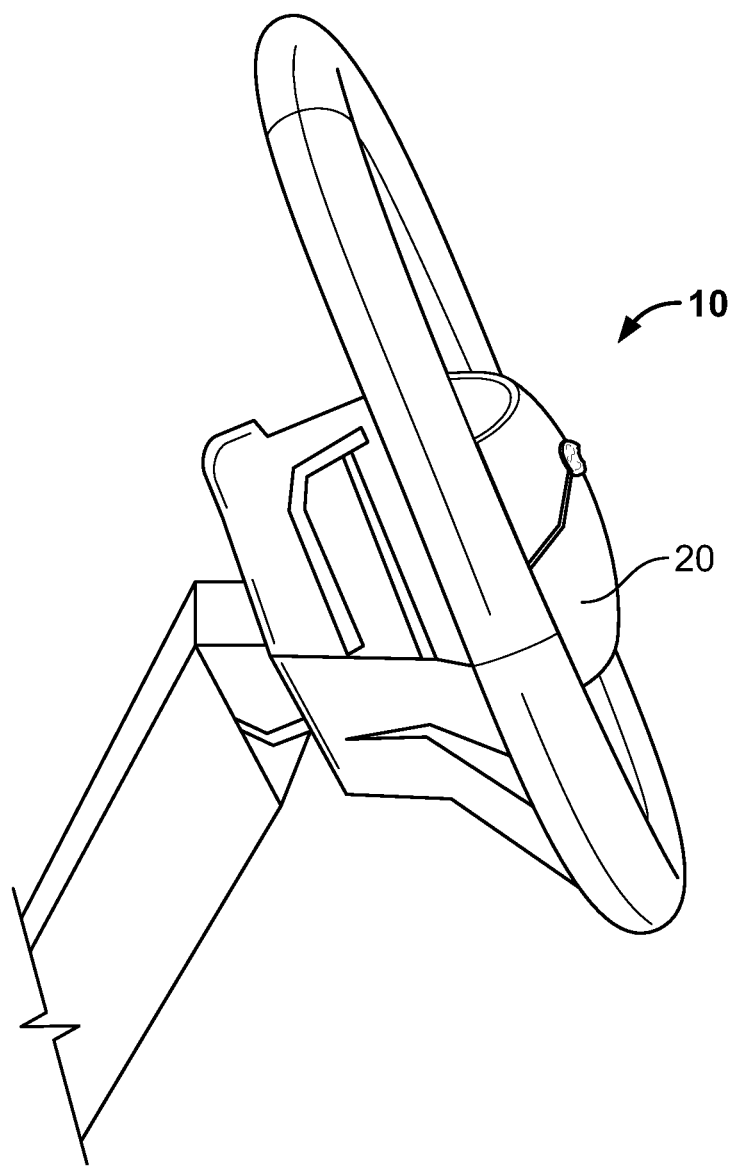
FIG. 6 is a drawing replicating a high speed photograph of initial deployment of the airbag underlying the cover of the present invention.
Figure 7:
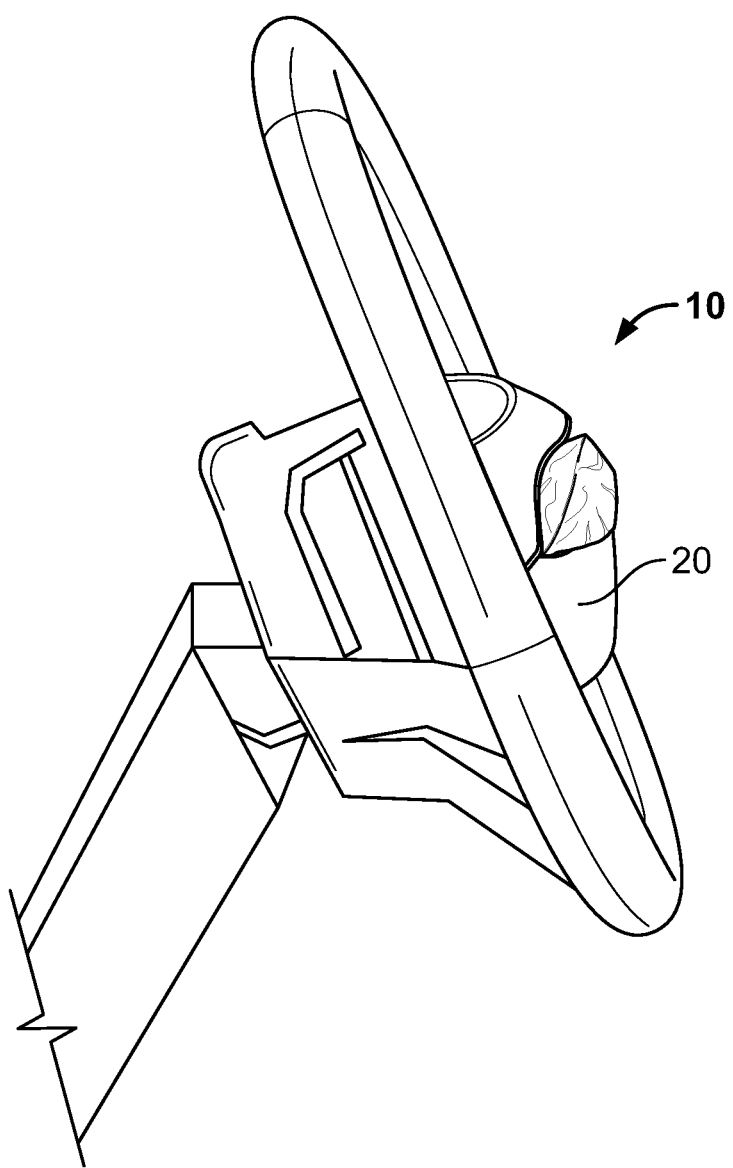
FIG. 7 is a second drawing replicating a later taken high speed photograph of the airbag deployment a short time later than FIG. 6 showing the cover of the present invention breaking as the airbag inflates.

With reference to FIGS. 6 and 7, drawings replicating high speed photographs are shown where an airbag is being deployed. As shown, on initial deployment the housing cover 40 is starting to swell and break as the center of the leather outer cover 20 component is swelling. The outer cover 20 being formed as a dome on the outer surface of the housing cover 40 will stretch slightly held by the assembly seam lines 24 during this very brief time of approximately 3.5 milliseconds as the underlying housing cover 40 breaks. The outer cover 20 will rupture randomly at a point of initiation, but does not determine the path of the tear. This point of initiation can be at one or more of the notches 25 or anywhere on the outer cover 20.

This is particularly useful in that there are no seams or indentations or other lines that would indicate any break path which is an undesirable and less than ideal cosmetic feature seen in many airbag cover assemblies. This design is such that the user will have no discernable mark pre-deployment as to where the outer cover 20 will tear. Additionally, the outer cover 20 being affixed directly to the housing cover 40 ensures that no small fragments or other material or debris can be projected towards the occupant during deployment.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag cover assembly comprises:
   a molded housing cover configured for attachment to an airbag module, the molded housing cover having an outer surface and an inner surface, the inner surface having a plurality of tear seams arranged to break along a predetermined path; and
   a leather outer cover glued or otherwise affixed directly onto the outer surface of the molded housing cover, the leather outer cover having a generally uniform thickness devoid of tear seams,
   wherein the leather outer cover is constructed from three separate pieces stitched together with threads longitudinally along a curved arc, the pieces being a middle piece and two side pieces that form a dome shaped leather outer cover with a pair of threaded assembly seam lines; and
   wherein the middle piece comprises an hourglass shape and the two side pieces are arc shaped, one side piece being on each side of the middle piece.

2. The airbag cover assembly of claim 1 wherein the threaded assembly seam lines extend inwardly, and the molded housing cover has a pair of complementary grooves to receive the threaded assembly seam lines allowing the leather outer cover to lie smoothly over the outer surface of the molded housing cover.

3. The airbag cover assembly of claim 1 wherein each of the threaded assembly seam line has a pair of notches for visually positioning the leather outer cover onto the molded housing cover during assembly.

4. The airbag cover assembly of claim 1 wherein each of the threaded assembly seam line comprises an outer thread forming a decorative sewing or styling line.

5. The airbag cover assembly of claim 1 where the airbag module includes a driver airbag module or a passenger airbag module.

6. The airbag cover assembly of claim 1 wherein the leather outer cover has no tear seam and the leather outer cover ruptures or tears randomly as the molded housing cover breaks along a predetermined path defined by the plurality of tear seams.

7. The airbag cover assembly of claim 6 wherein each of the threaded assembly seam lines comprises a notch and threads, wherein the notch weakens the threaded assembly seam line outward of the threads creating an initial tear location across the threaded assembly seam line.

8. The airbag cover assembly of claim 1 wherein the thickness is in a range of about 5 mm to 0.25 mm.

9. The airbag cover assembly of claim 8 wherein the thickness is less than 1.0 mm.

10. The airbag cover assembly of claim 9 wherein the thickness is about 0.6 mm.

* * * * *